(12) United States Patent
Ratnakar et al.

(10) Patent No.: US 9,787,508 B2
(45) Date of Patent: Oct. 10, 2017

(54) COMPUTING SYSTEM WITH COMMUNICATION LINK MECHANISM AND METHOD OF OPERATION THEREOF

(71) Applicant: Samsung Electronics Co., Ltd., Suwon-si, Gyeonggi-Do (KR)

(72) Inventors: Niranjan N Ratnakar, San Diego, CA (US); Pranav Dayal, San Diego, CA (US); Haechul Lee, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/007,086

(22) Filed: Jan. 26, 2016

(65) Prior Publication Data
US 2017/0163454 A1    Jun. 8, 2017

Related U.S. Application Data

(60) Provisional application No. 62/262,291, filed on Dec. 2, 2015.

(51) Int. Cl.
*H04L 27/06* (2006.01)
*H04L 27/00* (2006.01)
*H04L 7/00* (2006.01)

(52) U.S. Cl.
CPC ........ *H04L 27/0014* (2013.01); *H04L 7/0008* (2013.01); *H04L 2027/0026* (2013.01)

(58) Field of Classification Search
CPC .................................................. H04L 27/0014
USPC .......................................................... 375/344
See application file for complete search history.

(56) References Cited

U.S. PATENT DOCUMENTS

| | | | |
|---|---|---|---|
| 6,122,330 A * | 9/2000 | Motohashi | H04L 1/08 375/335 |
| 7,894,539 B2 | 2/2011 | Lin et al. | |
| 8,259,875 B2 | 9/2012 | Lipka et al. | |
| 8,369,279 B2 | 2/2013 | Swarts et al. | |
| 8,380,151 B2 | 2/2013 | Swarts et al. | |
| 8,489,133 B2 | 7/2013 | Matsumoto | |
| 9,231,648 B2 * | 1/2016 | Lingam | H04B 1/7075 |
| 2010/0202546 A1 | 8/2010 | Ruan et al. | |
| 2015/0030108 A1 | 1/2015 | Chae et al. | |
| 2015/0172089 A1 | 6/2015 | Chae et al. | |
| 2016/0381581 A1 * | 12/2016 | Stanciu | H04L 5/0048 370/252 |

* cited by examiner

*Primary Examiner* — Lihong Yu
(74) *Attorney, Agent, or Firm* — IP Investment Law Group

(57) ABSTRACT

A computing system includes: an inter-device interface configured to receive communication signal for communicating between a device and a further device; a communication circuit, coupled to the inter-device interface, configured to: calculate an initial offset estimate based on the communication signal, dynamically generate a dynamic candidate set based on the initial offset estimate, and determine a level offset for the communication signal for communicating between the device and the further device.

12 Claims, 6 Drawing Sheets

COMPUTING SYSTEM WITH COMMUNICATION LINK MECHANISM AND METHOD OF OPERATION THEREOF

CROSS-REFERENCE TO RELATED APPLICATION(S)

This application claims the benefit of U.S. Provisional Patent Application Ser. No. 62/262,291 filed Dec. 2, 2015, and the subject matter thereof is incorporated herein by reference thereto.

TECHNICAL FIELD

An embodiment described herein relates generally to a computing system, and more particularly to a system with communication link mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences and processing errors, as well as computational complexities rising from numerous possible formats for communicated information, which affect the quality and speed of the accessible data.

Thus, a need still remains for a computing system with a communication link mechanism. In view of the ever-increasing commercial competitive pressures, along with growing consumer expectations and the diminishing opportunities for meaningful product differentiation in the marketplace, addressing such issues are becoming increasingly valuable. Additionally, the need to reduce costs, improve efficiencies and performance, and meet competitive pressures adds an even greater urgency for finding answers to these problems.

Solutions to these problems have been long sought but prior developments have not taught or suggested any solutions and, thus, solutions to these problems have long eluded those skilled in the art.

SUMMARY

An embodiment described herein provides a computing system, including: an inter-device interface configured to receive communication signal for communicating between a device and a further device; a communication unit, coupled to the inter-device interface, configured to: calculate an initial offset estimate based on the communication signal, dynamically generate a dynamic candidate set based on the initial offset estimate, and determine a level offset for the communication signal for communicating between the device and the further device.

An embodiment described herein provides a method of operation of a computing system including: receiving communication signal for communicating between a device and a further device; calculating an initial offset estimate based on the communication signal; dynamically generating a dynamic candidate set with a communication unit based on the initial offset estimate; and determining a level offset for the communication signal for communicating between the device and the further device.

An embodiment described herein provides a non-transitory computer readable medium including instructions for operating a computing system including: receiving communication signal for communicating between a device and a further device; calculating an initial offset estimate based on the communication signal; dynamically generating a dynamic candidate set with a communication unit based on the initial offset estimate; and determining a level offset for the communication signal for communicating between the device and the further device.

Certain embodiments have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
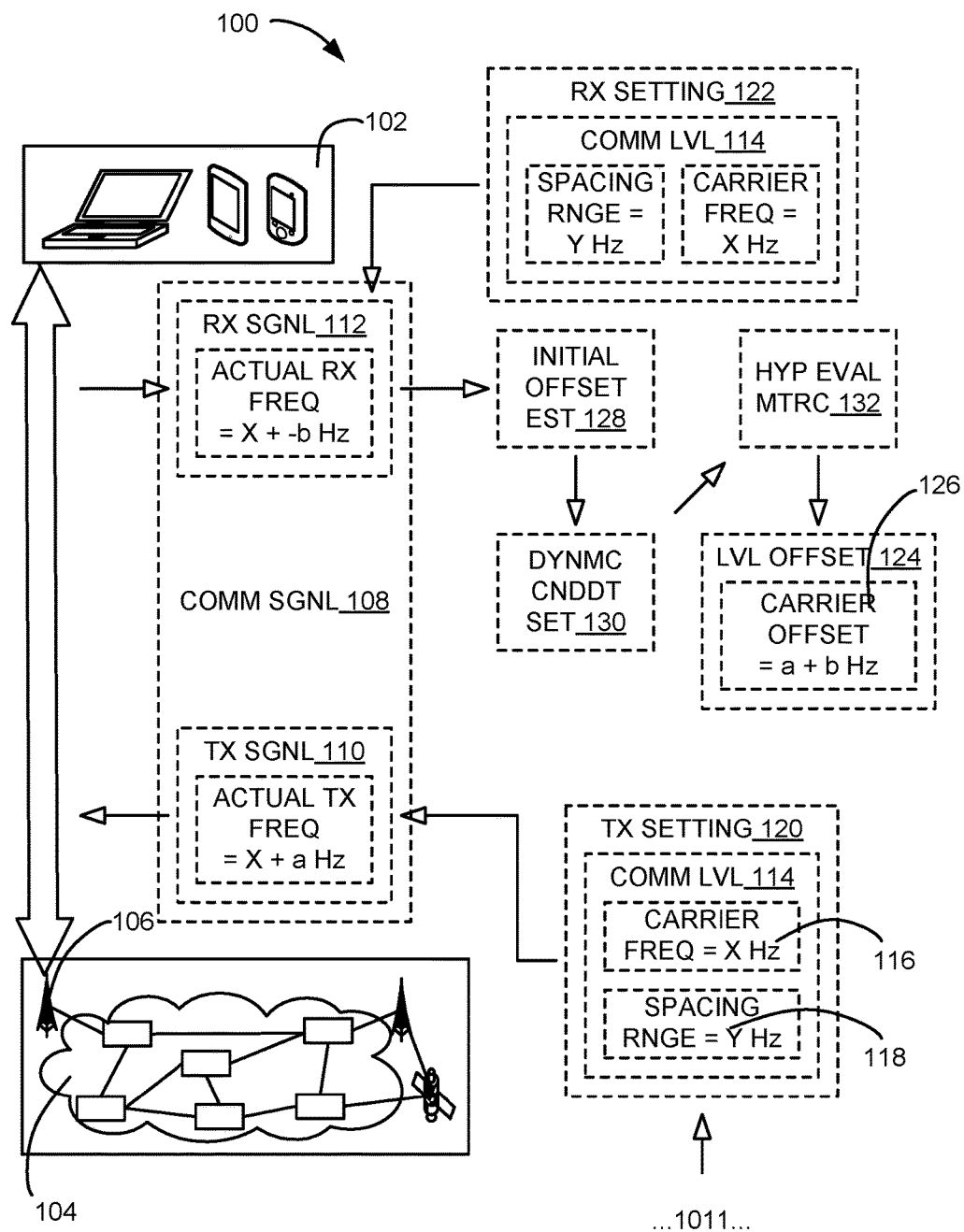
FIG. 1 is an exemplary illustration of a computing system with a communication link mechanism, according to one embodiment.

The following embodiments can dynamically generate dynamic candidate set for correcting or reducing level offset in communication signal exchanged between devices. The dynamic candidate set can be based on an initial offset estimate. The dynamic candidate set can further be processed over an interval set and based on repetitive portion of the communication signal. The dynamic candidate set can be evaluated using hypothesis evaluation metric to correct or adjust for the level offset.

The following embodiments are described in sufficient detail to enable those skilled in the art to make and use the invention. It is to be understood that other embodiments would be evident based on the present disclosure, and that system, process, architectural, or mechanical changes can be made without departing from the scope of an embodiment of the present invention.

In the following description, numerous specific details are given to provide a thorough understanding of the invention. However, it will be apparent that the invention and various embodiments may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "block" referred to herein can include or be implemented as software, hardware, or a combination thereof in an embodiment of the present invention in accordance with the context in which the term is used. For example, the software includes machine code, firmware, embedded code, and application software. The software can also include a function, a call to a function, a code block, or a combination thereof. Also for example, the hardware includes gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof. Further, if a block is written in the apparatus claims section below, the blocks are deemed to include hardware circuitry for the purposes and the scope of apparatus claims.

The blocks in the following description of the embodiments can be coupled to one other as described or as shown. The coupling can be direct or indirect without or with, respectively, intervening between coupled items. The coupling can be physical contact or by communication between items.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown an exemplary illustration of a computing system 100 with a communication link mechanism, according to one embodiment. The computing system 100 includes a first device 102, such as a user electronic device, connected to a network 104. The first device 102 can include a portable or mobile device, a stationary device, a consumer device, a host device, or a combination thereof.

For example, the first device 102 includes a mobile phone, a smart phone, a wearable device, an implanted device, a laptop or tablet computer, a vehicle, a portion therein, or a combination thereof. Also for example, the first device 102 includes a router, a server, an object or an article including Internet of Things (IoT) capability or feature therein, a desktop computer, a portion therein, or a combination thereof.

Also for example, the first device 102 includes a circuit or a device within a comprehensive device, such as a portion or circuit specializing in processing information within a storage device or system. Also for example, the first device 102 includes user equipment (UE).

The network 104 is a system of wired or wireless communication devices or means that are connected to each other for enabling communication between devices. For example, the network 104 includes a combination of wires, transmitters, receivers, antennas, towers, stations, repeaters, telephone network, servers, or client devices for a wireless cellular network. The network 104 can also include a combination of routers, cables, computers, servers, and client devices for various sized area networks, for a wireless cellular network, or a combination thereof. Also for example, the network 104 includes a communication bus, a wire, a cable, a wireless connection, or a combination thereof between units within a device.

The first device 102 can communicate with or through the network 104. The first device 102 can further communicate with a further instance of the first device 102. The first device 102 can communicate with the further instance of the first device 102 either directly or through the network 104.

The computing system 100 can include a second device 106, such as an access node, for directly or indirectly linking and communicating with the first device 102. The network 104 can include the second device 106. The second device 106 can receive wireless or wired communication signals from the first device 102, transmit signals to the first device 102, process signals, or a combination thereof. The second device 106 can also relay signals between other instances of the second device 106, components within the network 104, or a combination thereof.

The first device 102 can be connected to the network 104 through the second device 106. The second device 106 can send signals to, receive signals from, or a combination thereof in communicating and connecting the first device 102.

For example, the second device 106 includes a router, a server, a gateway, a modem, a base station, a cell tower, a wireless router, an antenna, a portion therein, or a combination thereof. Also for example, the second device 106 includes a user device or a mobile device acting as a base station, an access point, a hub, a hotspot, a tethering point, a peer-to-peer network component, or a combination thereof. Also for example, the second device 106 includes an evolved node B (eNodeB) as an element in an air interface representing evolved UMTS terrestrial radio access (e-UTRA).

Also for example, the second device 106 includes a communication device or a processing component included or with a cell tower, a wireless router, an antenna, or a combination thereof being used to communicate with, such as by sending signals to or receiving signals from, the first device 102 including a mobile computing device. Also for example, the second device 106 includes a portion or circuit specializing in storing information within the storage device or system.

The second device 106 can be used to wirelessly exchange signals representing content for communication, including voice or sounds of a telephone call or data representing a webpage, text, a picture, an instruction, an interaction therewith, a control parameter, or a combination thereof. The second device 106 can also transmit reference signals, training signals, error detection signals, error correction signals, header information, transmission format, protocol information, or a combination thereof for enabling the communication of the content.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The computing system 100 can communicate and exchange communication signal 108 between devices, such as between the first device 102, the second device 106, the further device 202, or a combination thereof. The computing system 100 can communicate and exchange the communication signal 108 through the network 104. The communication signal 108 can include information exchanged between separate or independent devices, including a transmitted signal 110 and a received signal 112.

The transmitted signal 110 can include information sent from a device to another device. The transmitted signal 110 can be sent from the first device 102, the second device 106, the further device 202, or a combination thereof. The transmitted signal 110 can be sent to another device, such as the first device 102, the second device 106, the further device 202, or a combination thereof.

The transmitted signal 110 can traverse a communication channel. The communication channel can include a path or a link for signal exchange including physical or wireless connections, protocols, route, or a combination thereof between devices.

The received signal 112 can include information received, detected, or determined at a device, such as the first device 102, the second device 106, or a combination thereof. The received signal 112 can correspond to the transmitted signal 110. The received signal 112 can be different from the transmitted signal 110. The received signal 112 can be the transmitted signal 110 received at a device.

The received signal 112 can also include the transmitted signal 110 altered or changed during transmission between devices. The received signal 112 can include the transmitted signal 110 altered or changed due to delay, reflection, refraction, degradation, phase shift, interfering signals from other transmitting sources, or a combination thereof. The received signal 112 can further include errors or influences based on inaccuracies or offsets inherent to or caused by hardware or circuits of transmitting device, receiving device, or a combination thereof.

For example, the communication signal 108 is transmitted and received according to a communication level 114. The communication level 114 can include a specific setting or a detail for a resource utilized in communicating information between devices, such as a carrier frequency 116 or a spacing range 118. The carrier frequency 116 can include a waveform used to modulate information intended for communication. The carrier frequency 116 can be higher in frequency than the intended information for communication.

The spacing range 118 can include a gap or a separation between frequencies utilized in communication. The spacing range 118 can be based on the communication protocol or format. For example, the spacing range 118 includes 15 kHz for channel separation for device-to-device communication, such as between the first device 102 and the further device 202, or for UE to base station communication, such as between the first device 102 and the second device 106. Also for example, the spacing range 118 includes 312.5 kHz for Wireless Fidelity (WiFi) communication.

The communication level 114 can be implemented according to a transmitter setting 120, a receiver setting 122, or a combination thereof. The transmitter setting 120 and the receiver setting 122 can include a characteristic, a trait, a configuration, or a combination thereof of a circuit or a unit in the transmitting device, the receiving device, or a combination thereof.

For example, the transmitter setting 120 and the receiver setting 122 includes intended or designed implementation of the communication level 114, such as the carrier frequency 116, the spacing range 118, or a combination thereof. As a more specific example, the transmitter setting 120 and the receiver setting 122 includes crystals designed to be tuned to the carrier frequency 116 for transmitting or receiving the information between devices.

The transmitter setting 120, the receiver setting 122, or a combination thereof can include an error, an offset, a difference, or a combination thereof in actual implementation and intended implementation of the communication level 114. The computing system 100 can experience a level offset 124 based on the error, the offset, the difference, or a combination thereof in actual and intended implementation during communication of information.

The level offset 124 is a difference or a separation between the communication level 114 of the transmitting device and the communication level 114 of the receiving device. The level offset 124 can be based on the error, the offset, the difference, or a combination thereof in actual implementation of the transmitter setting 120, the receiver setting 122, in comparison to intended or designed implementation, or a combination thereof.

For example, the level offset 124 includes a carrier frequency offset (CFO) 126. The carrier frequency offset 126 is a gap, a difference, a separation, or a combination thereof in the actual implementation of the carrier frequency 116 for the receiving device and the transmitting device.

The carrier frequency offset 126 can be based on the receiver setting 122, the transmitter setting 120, a difference between an actual implementation and a designed or intended implementation thereof, or a combination thereof. As a more specific example, the carrier frequency offset 126 is based on a difference between an actual implemented transmission frequency and the transmitter setting 120, a difference between an actual implemented receiving frequency and the receiver setting 122, or a combination thereof.

The computing system 100 can process the level offset 124, including the carrier frequency offset 126, based on an initial offset estimate 128, a dynamic candidate set 130, or a combination thereof. The initial offset estimate 128 is a calculated approximation or determination of the level offset 124. The computing system 100 can calculate the initial offset estimate 128, such as using the user equipment or device, the server, the access node, or a combination thereof.

The dynamic candidate set 130 is a grouping of possible actual instances of the level offset 124. The dynamic candidate set 130 can be generated dynamically or during operation of one or more of the devices or at the time of communication. The dynamic candidate set 130 can be generated based on or in response to the communicated information, such as the communication signal 108 including the transmitted signal 110 or the received signal 112. The computing system 100 can use the dynamic candidate set 130 instead of a predetermined or a preset group of possible instances of the level offset 124.

The dynamic candidate set 130 can include one or more hypotheses for the level offset 124. The dynamic candidate set 130 can include one or more CFO hypothesis candidates for the carrier frequency offset 126. The dynamic candidate set 130 can include one or more CFO hypothesis candidates for frequencies hypothesizing the level offset 124. The one or more CFO hypothesis can each correspond to a time or a time hypothesis.

The computing system 100 can further calculate a hypothesis evaluation metric 132. The hypothesis evaluation metric 132 is a calculated result for assessing the dynamic candidate set 130 or the hypotheses therein. The hypothesis evaluation metric 132 can include a measure for evaluating the CFO hypothesis candidates in determining the level offset 124. The hypothesis evaluation metric 132 can include one or more values or measures corresponding to the one or more hypotheses in the dynamic candidate set 130.

The computing system 100 can calculate the initial offset estimate 128, generate the dynamic candidate set 130, calculate the hypothesis evaluation metric 132, or a combination thereof based on the communication signal 108, such as the transmitted signal 110 or the received signal 112, or a portion therein. The computing system 100 can use the initial offset estimate 128, the dynamic candidate set 130, the hypothesis evaluation metric 132, or a combination thereof to determine the level offset 124, adjust the transmitter setting 120 or the receiver setting 122, process the communication signal 108, or a combination thereof.

Figure 2:
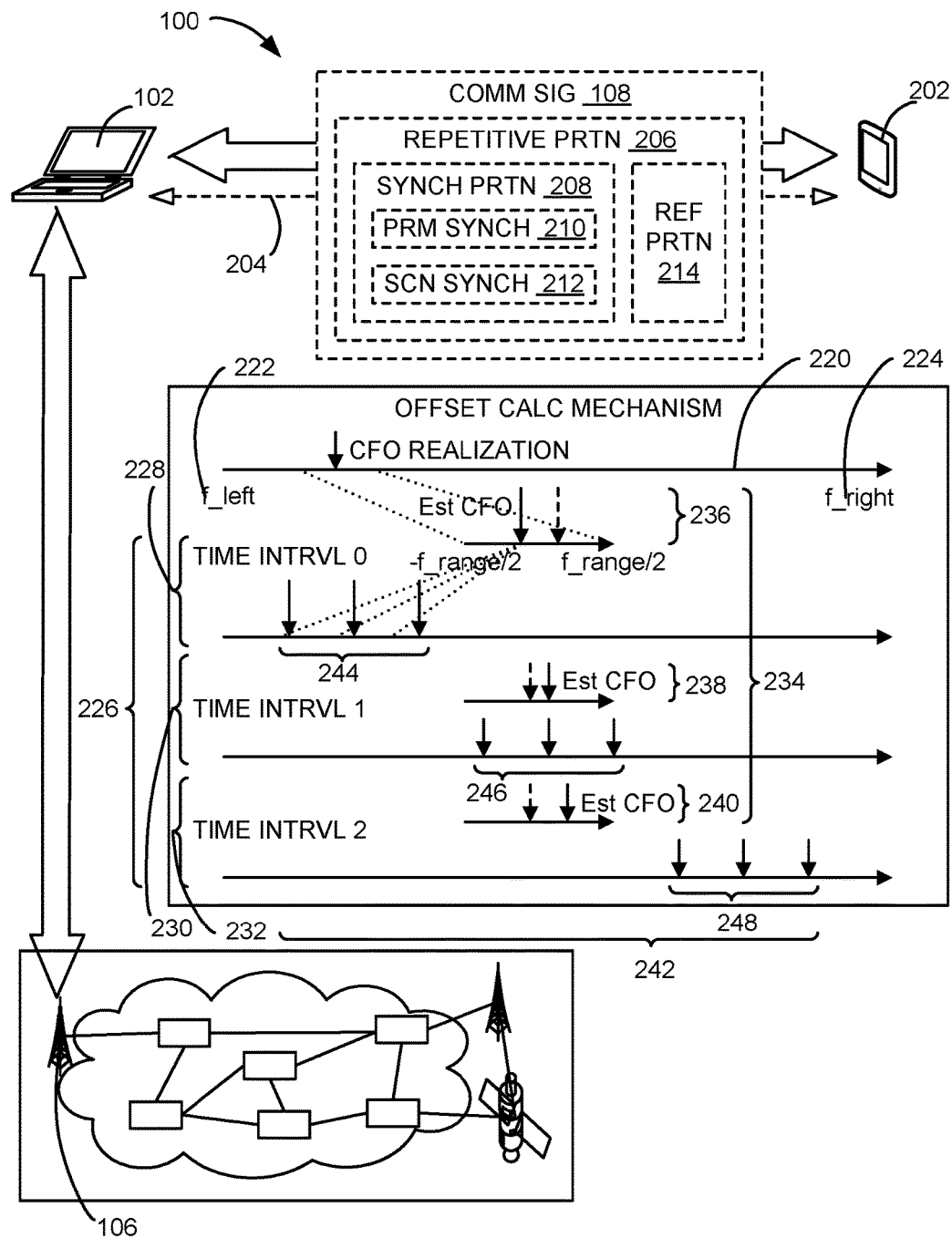
FIG. 2 is a further exemplary illustration of the computing system, according to one embodiment.

Referring now to FIG. 2, therein is shown a further exemplary illustration of the computing system 100, according to one embodiment. The computing system 100 includes a further device 202.

The further device 202 can be a client device or a server, similar to the first device 102, the second device 106, or a combination thereof. For example, the further device 202 includes a mobile device or an end-user device such as a phone, a smart phone, a wearable device, an implanted device, a laptop or tablet computer, a vehicle, a portion therein, or a combination thereof.

Also for example, the further device 202 includes a user device or a mobile device acting as a base station, an access point, a hub, a hotspot, a tethering point, a peer-to-peer network component, or a combination thereof. Also for example, the further device 202 includes a router, a server, an object or an article including Internet of Things (IoT) capability or feature therein, a desktop computer, a base station, a gateway, a cell tower, an antenna, a portion therein, or a combination thereof.

For illustrative purposes, the first device 102 and the further device 202 will be described as end-user devices and the second device 106 as a base station or eNodeB as discussed above. However, it is understood that the first device 102, the second device 106, the further device 202, or a combination thereof can be different devices as discussed above.

The computing system 100 can exchange the communication signal 108 of FIG. 1 with the further device 202. The computing system 100 can process the communication signal 108 exchanged between the first device 102, the second device 106, the further device 202, or a combination thereof. The further device 202 can transmit the transmitted signal 110 of FIG. 1, receive the received signal 112 of FIG. 1, or a combination thereof.

The further device 202 can communicate the communication signal 108 based on or according to the communication level 114 of FIG. 1. The further device 202 can transmit based on or according to the transmitter setting 120 of FIG. 1, receive based on or according to receiver setting 122 of FIG. 1, or a combination thereof.

The computing system 100 can communicate the communication signal 108 between user devices or UEs. The communication signal 108 can include or utilize a direct link 204. The direct link 204 is a communication connection directly between user devices without intervening devices, such as a server, a router, a gateway, an access point, a repeater, or a combination thereof.

The direct link 204 can include communication channel, a communication protocol, hardware components, or a combination thereof. For example, the direct link 204 includes SideLink™, device-to-device connection, a mechanism or a protocol thereof, or a combination thereof. Also for example, the direct link 204 includes a transmitter, a receiver, a port, a connector or a wire, a specific instance of the carrier frequency 116 of FIG. 1, a coding-decoding mechanism, a symbol set or constellation, or a combination thereof.

The direct link 204 can include a mode or a type of communication for providing cellular communication directly between instances of UEs or mobile devices without utilizing the second device 106 to relay the signals. The second device 106 can designate communication control parameters, such as for carrier frequency or frequency band, MCS, coding, time slots, signal strength, communication standard or protocol, or a combination thereof for directly exchanging information between the first device 102 and the further device 202 without communicating through the second device 106.

The direct link 204 can include cellular communications, such as voice, text, image, instructions, or a combination of data exchanged between user devices. The direct link 204 can be separate and different from connecting to accessory devices, and from connecting using non-cellular protocols. For example, the direct link 204 can be separate and different from Bluetooth communication, near field communication (NFC), or a combination thereof. Also for example, the direct link 204 can be separate from fix frequency dedicated communication, such as used in walkie-talkies or various signal broadcasts.

The computing system 100 can include the first device 102 and the further device 202, both as UE or end user devices, communicating the communication signal 108 directly with each other through the direct link 204. The computing system 100 can include the first device 102 and the further device 202 communicating the communication signal 108 directly with each other through the direct link 204 and without the second device 106 relaying the communication signal 108 between the first device 102 and the further device 202.

The computing system 100 can further exchange the communication signal 108 including a repetitive portion 206. The repetitive portion 206 is a segment within the communication signal 108 including identical information existing at multiple different times. The repetitive portion 206 can include information repeated across different units of communication or within one unit of communication, such as a packet or a resource block.

The repetitive portion 206 can be for the communication signal 108 between a UE or an end-point device and a base station, an access node, a router, or a combination thereof. The repetitive portion 206 can also be for the communication signal 108 utilizing the direct link 204. The repetitive portion 206 can further include the identical information repeated immediately or successive, with the repeated information abutting each other across units of communication resource, such as frequency, time, or a combination thereof.

For example, the repetitive portion 206 includes a reference portion or a pilot tone. Also for example, the repetitive portion 206 includes a synchronization portion 208, such as a primary synchronization 210, a secondary synchronization 212, or a combination thereof.

The synchronization portion 208 is a portion within the communication signal 108 utilized to or designated to establish a common timing between communicating devices. The synchronization portion 208 can include a specific instance of a symbol or specific information, a timing or a duration thereof, a frequency or a relative location thereof, a sequence thereof, or a combination thereof.

The synchronization portion 208 can include information, stimulus, a pattern thereof, or a sequence thereof, or a combination thereof intended for operating multiple device in unison. The synchronization portion 208 can align with or coincide in timing, an operation, a process, a cycle, a clock, or a combination thereof between devices in the computing system 100 that are otherwise operating independently and utilizing independent timing, operation, processes, or a combination thereof. For example, the synchronization portion 208 includes a specific symbol repeated successively or immediately across communication resources.

As a more specific example, the synchronization portion 208 includes the primary synchronization 210, such as a primary synchronization signal (PSS) or a primary sidelink synchronization signal (PSSS), the secondary synchronization 212, such as a secondary synchronization signal (SSS) or a secondary sidelink synchronization signal (SSSS), or a combination thereof. The primary synchronization 210 can occur before, after, or coinciding in time, above, below, or coinciding in frequency, using a relative phase offset, or a combination thereof in relation to the secondary synchronization 212.

The synchronization portion 208 can include a specific or a predetermined content, format, timing, sequence, pattern, structure, characteristics, physical trait, or a combination thereof. For example, the synchronization portion 208 includes one or more specific predetermined, known, or designated symbols. The synchronization portion 208 can be based on specific instance or value of the symbol, cell identification, symbol location, the modulation constellation or scheme, or a combination thereof predetermined by the computing system 100, the communication protocol or standard, or a combination thereof.

As a more specific example, the synchronization portion 208 includes the same instance of the symbol transmitted at separate transmission occasions or opportunities, such as for slots, times, frequencies, phases, or a combination thereof. Also as a more specific example, the synchronization portion 208 includes the known synchronization symbols abutting each other, back-to-back to each other, sharing a boundary with each other, or a combination thereof in the transmission occasions or opportunities, including slots, times, frequencies, phases, or a combination thereof.

The communication signal 108 can further include a reference portion 214. The reference portion 214 can include a reference symbol, a pilot tone, a demodulation reference signal (DMRS), or a combination thereof. The computing system 100 can use the repetitive portion 206 of the communication signal 108, such as the synchronization portion 208 or the reference portion 214, to calculate the initial offset estimate 128 of FIG. 1.

The computing system 100 can use the initial offset estimate 128 to dynamically generate the dynamic candidate set 130 of FIG. 1. The computing system 100 can use the dynamic candidate set 130 to determine or estimate an actual instance of the level offset 124 of FIG. 1 and make adjustments accordingly for communicating between devices. Details regarding the initial offset estimate 128, the dynamic candidate set 130, and processing thereof are discussed below.

The computing system 100 can include an offset calculation mechanism. The offset calculation mechanism can include a method, a process, a circuitry, or a combination thereof configured to calculate or process the level offset 124 for exchanging the communication signal 108. The offset calculation mechanism can calculate the initial offset estimate 128, dynamically generate the dynamic candidate set 130, a processing thereof, or a combination thereof. Details regarding the offset calculation mechanism are discussed below.

The computing system 100 can process a level range 220. The level range 220 can include a set of frequencies that can include the actual instance of the communication level 114. The level range 220 can include a range including potentials of CFO realization. The level range 220 can be based on a first boundary 222 and a second boundary 224. The first boundary 222 and the second boundary 224 can define ends or borders for the level range 220.

For example, the first boundary 222 and the second boundary 224 are each based on an end-frequency of the level range 220. Also for example, the level range 220 is based on the spacing range 118 of FIG. 1.

The computing system 100 can process the level offset 124 based on an interval set 226. The interval set 226 can include a grouping of time intervals associated with the communication signal 108. The interval set 226 can divide a single unit or a section of the communication signal 108, or a portion therein, into multiple sub-groups, such as a first interval 228, a second interval 230, a third interval 232, or a combination thereof.

As a more specific example, the interval set 226 includes multiple periods of the synchronization signal or the synchronization portion 208 with the first interval 228 and the second interval 230 each corresponding to one period. The synchronization signal can be periodically communicated with a period or a frequency corresponding to the first interval 228, the second interval 230, or a combination thereof.

The first interval 228, the second interval 230, the third interval 232, or a combination thereof can be non-overlapping durations within the communication signal 108. For example, the first interval 228 includes a first third, the second interval 230 includes a second third, and the third interval 232 includes a last third of the communication signal 108.

The computing system 100 can process the level offset 124 in an iterative manner over multiple time intervals according to the interval set 226. For example, the computing system 100 calculates the initial offset estimate 128, generate the dynamic candidate set 130 or a portion therein, or a combination thereof for each interval within the interval set 226. The computing system 100 can utilize the iterative processing result to process the level offset 124.

As a more specific example, the computing system 100 calculates the initial estimate set 234 including a first estimate 236, a second estimate 238, a third estimate 240, or a combination thereof. The initial estimate set 234 can include instances of the initial offset estimate 128 corresponding to the interval set 226. The initial estimate set 234 can include multiple instances of the initial offset estimate 128 in processing for one or same instance of the level offset 124.

The first estimate 236, the second estimate 238, and the third estimate 240 can be an instance of the initial offset estimate 128 corresponding to a processing interval. Continuing with the example, the first estimate 236 corresponds to the first interval 228, the second estimate 238 corresponds to the second interval 230, and the third estimate 240 corresponds to the third interval 232.

Also as a more specific example, the computing system 100 generates a dynamic candidate subgrouping 242, such as a first subgrouping 244, a second subgrouping 246, a third subgrouping 248, or a combination thereof. The dynamic candidate subgrouping 242 can include one or more candidates for the level offset 124 for the dynamic candidate set 130. The dynamic candidate subgrouping 242 can include the one or more candidates within and less than a full set of the dynamic candidate set 130.

The dynamic candidate subgrouping 242 can correspond to the interval set 226. Continuing with the example, the first subgrouping 244 corresponds to the first interval 228, the second subgrouping 246 corresponds to the second interval 230, and the third subgrouping 248 corresponds to the third interval 232.

For illustrative purposes, the dynamic candidate subgrouping 242 is shown as including three candidates for each time interval corresponding to three synchronization periods. However, it is understood that the dynamic candidate subgrouping 242 can include any number of candidates, such as one or more, for each time interval. Also, it is understood that the dynamic candidate subgrouping 242 can include differing number of candidates across time intervals.

For further illustrative purposes, the offset calculation mechanism is shown and discussed as utilizing three intervals, estimates and candidate subgroupings. However, it is understood that the offset calculation mechanism can process the level offset 124 in one interval, without utilizing multiple intervals. Also, the offset calculation mechanism can process using non-sequential intervals, using any set of 2 or more intervals, or a combination thereof.

For further illustrative purposes, the computing system 100 is discussed as processing the level offset 124 for the direct link 204, and for communicating between UEs including the first device 102 and the further device 202. However, it is understood that the computing system 100 can process the level offset 124 for other communications, such as between a UE and a base station or an access node, for WiFi communication, wired communication, communication through the network 104 of FIG. 1, or a combination thereof.

Figure 3:
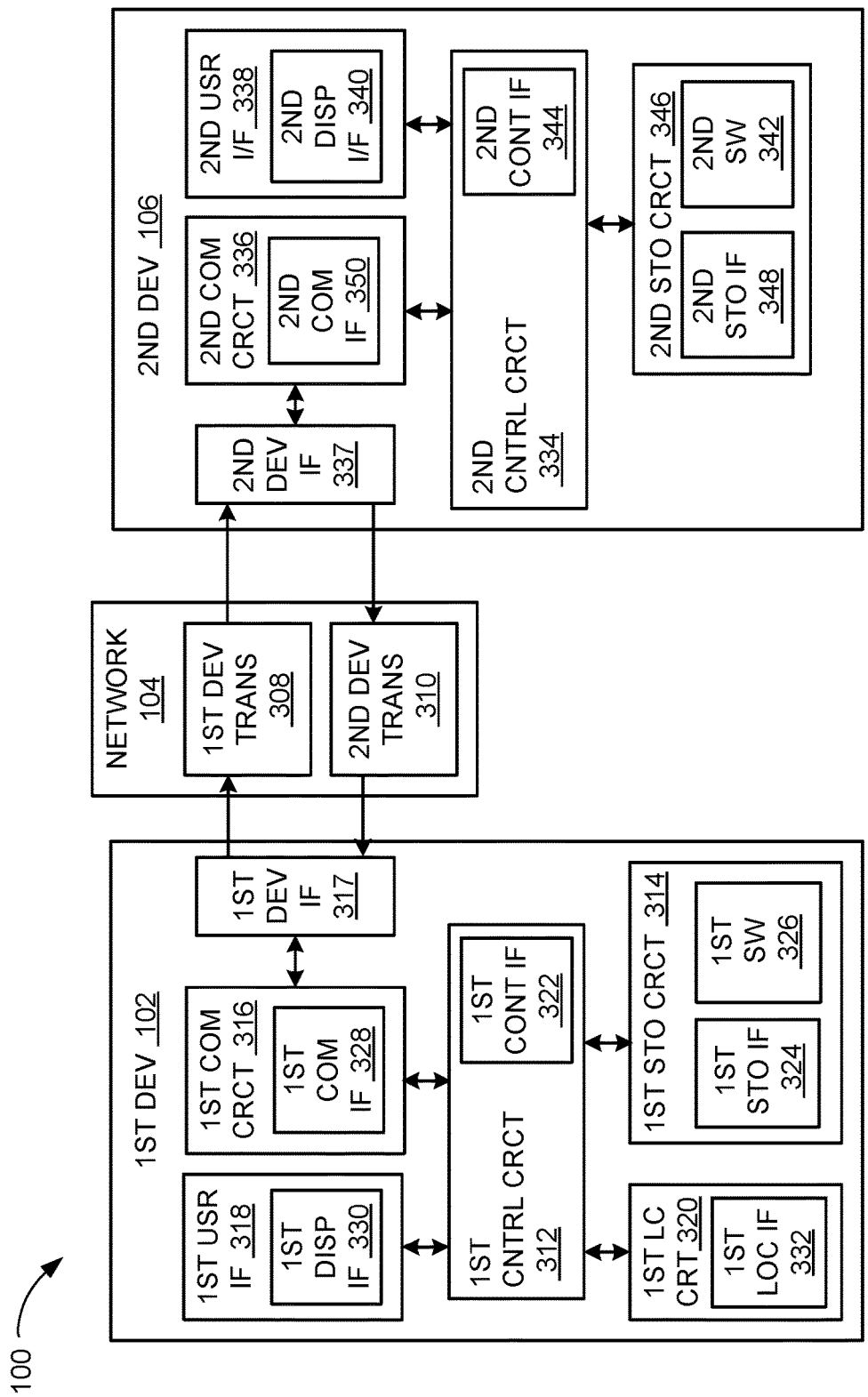
FIG. 3 is an exemplary illustration of the computing system in a block diagram format, according to one embodiment.

Referring now to FIG. 3, therein is shown an exemplary illustration of the computing system 100 in a block diagram format, according to one embodiment. The computing system 100 includes the first device 102, the network 104, and a second device 106.

The first device 102 can send information in a first device transmission 308 over the network 104 to the second device 106. The second device 106 can send information in a second device transmission 310 over the network 104 to the first device 102.

For illustrative purposes, the computing system 100 is shown with the first device 102 as a client device, although it is understood that the computing system 100 can have the first device 102 as a different type of device. For example, the first device 102 is a server having a display interface.

Also for illustrative purposes, the computing system 100 is shown with the second device 106 as a base station, although it is understood that the computing system 100 can have the second device 106 as a different type of device. For example, the second device 106 is a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, a first user interface 318, and a first location circuit 320. The first control circuit 312 can include a first control interface 322. The first control circuit 312 can execute a first software 326 to provide the intelligence of the computing system 100.

The first control circuit 312 can be implemented in a number of different manners. For example, the first control circuit 312 is a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits, or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 is implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 is a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 permits the first device 102 to communicate with the second device 106, a different device, an attachment, such as a peripheral device or a desktop computer, the network 104, or a combination thereof.

The first communication circuit 316 can also function as a communication hub allowing the first device 102 to function as part of the network 104 and not limited to be an end point or terminal unit to the network 104. The first communication circuit 316 can include active and passive components, such as microelectronics or an antenna, for interaction with the network 104.

The first communication circuit 316 can include a baseband device or component, a modem, a digital signal processor, or a combination thereof for transmitting, formatting, receiving, detecting, decoding, further processing, or a combination thereof for communication signals. The first communication circuit 316 can include one or more portions for processing the voltages, the currents, the digital information, or a combination thereof, such as an analog-to-digital converter, a digital-to-analog converter, a filter, an amplifier, a processor-type circuitry, or a combination thereof. The first communication circuit 316 can further include one or more portions for storing information, such as cache or RAM memory, registers, or a combination thereof.

The first communication circuit 316 can be coupled with a first inter-device interface 317. The first inter-device interface 317 can be a device or a portion of a device for physically communicating signals with a separate device. The first inter-device interface 317 can communicate by transmitting or receiving signals to or from another device. The first inter-device interface 317 can include one or more antennas for wireless signals, a physical connection and receiver-transmitter for wired signals, or a combination thereof. The first inter-device interface 317 can include an omnidirectional antenna, a wire, an antenna chip, a ceramic antenna, or a combination thereof. The first inter-device interface 317 can further include a port, a wire, a repeater, a connector, a filter, a sensor, or a combination thereof.

The first inter-device interface 317 can detect or respond to a power in electromagnetic waves and provide the detected result to the first communication circuit 316 to receive a signal, including the second device transmission 310. The first inter-device interface 317 can provide a path or respond to currents or voltages provided by the first communication circuit 316 to transmit a signal, including the first device transmission 308.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the computing system 100. The first control circuit 312 can also execute the first software 326 for the other functions of the computing system 100, including receiving location information from the first location circuit 320. The first control circuit 312 can further execute the first software 326 for interaction with the network 104 via the first communication circuit 316.

The first location circuit 320 can generate location information, current heading, current acceleration, and current speed of the first device 102, as examples. The first location circuit 320 can be implemented in many ways. For example, the first location circuit 320 functions as at least a part of the global positioning system, an inertial navigation system, a cellular-tower location system, a pressure location system, or any combination thereof. Also, for example, the first location circuit 320 utilizes components such as an accelerometer or GPS receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control circuit 334 can execute a second software 342 to provide the intelligence of the second device 106 of the computing system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the computing system 100, including operating the second communication circuit 336 to communicate with the first device 102 over the network 104.

The second control circuit 334 can be implemented in a number of different manners. For example, the second control circuit 334 is a processor, an embedded processor, a microprocessor, hardware control logic, a hardware finite state machine (FSM), a digital signal processor (DSP), or a combination thereof.

The second control circuit 334 can include a second control interface 344. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 is implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the computing system 100 is shown with the second storage circuit 346 as a single hierarchy storage system, although it is understood that the computing system 100 can have the second storage circuit 346 in a different configuration. For example, the second storage circuit 346 is formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 is a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 permits the second device 106 to communicate with the first device 102 over the network 104.

The second communication circuit 336 can also function as a communication hub allowing the second device 106 to function as part of the network 104 and not limited to be an end point or terminal unit to the network 104. The second communication circuit 336 can include active and passive components, such as microelectronics or resistors, for interaction with the network 104.

The second communication circuit 336 can include a baseband device or component, a modem, a digital signal processor, or a combination thereof for transmitting, formatting, receiving, detecting, decoding, further processing, or a combination thereof for communication signals. The second communication circuit 336 can include one or more portions for processing the voltages, the currents, the digital information, or a combination thereof, such as an analog-to-digital converter, a digital-to-analog converter, a filter, an amplifier, a processor-type circuitry, or a combination thereof. The second communication circuit 336 can further include one or more portions for storing information, such as cache or RAM memory, registers, or a combination thereof.

The second communication circuit 336 can be coupled with a second inter-device interface 337. The second inter-device interface 337 can be a device or a portion of a device for physically communicating signals with a separate device. The second inter-device interface 337 can communicate by transmitting or receiving signals to or from another device. The second inter-device interface 337 can include one or more antennas for wireless signals, a physical connection and receiver-transmitter for wired signals, or a combination thereof. The second inter-device interface 337 can include an omnidirectional antenna, a wire, an antenna chip, a ceramic antenna, or a combination thereof. The second inter-device interface 337 can further include a port, a wire, a repeater, a connector, a filter, a sensor, or a combination thereof.

The second inter-device interface 337 can detect or respond to a power in electromagnetic waves and provide the detected result to the second communication circuit 336 to receive a signal, including the first device transmission 308. The second inter-device interface 337 can provide a path or respond to currents or voltages provided by the second communication circuit 336 to transmit a signal, including the second device transmission 310.

The second communication circuit 336 can include a second communication interface 350. The second communication interface 350 can be used for communication between the second communication circuit 336 and other functional units/circuits in the second device 106. The second communication interface 350 can receive information from the other functional units/circuits or can transmit information to the other functional units/circuits.

The second communication interface 350 can include different implementations depending on which functional units/circuits are being interfaced with the second communication circuit 336. The second communication interface 350 can be implemented with technologies and techniques similar to the implementation of the second control interface 344.

The first communication circuit 316 can couple with the network 104 to send information to the second device 106 in the first device transmission 308. The second device 106 can receive information in the second communication circuit 336 from the first device transmission 308 of the network 104.

The second communication circuit 336 can couple with the network 104 to send information to the first device 102 in the second device transmission 310. The first device 102 can receive information in the first communication circuit 316 from the second device transmission 310 of the network 104. The computing system 100 can be executed by the first control circuit 312, the second control circuit 334, or a combination thereof. For illustrative purposes, the second device 106 is shown with the partition having the second user interface 338, the second storage circuit 346, the second control circuit 334, and the second communication circuit 336, although it is understood that the second device 106 can have a different partition. For example, the second software 342 is partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits are implemented using a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the blocks and functions of the computing system 100.

Figure 4:
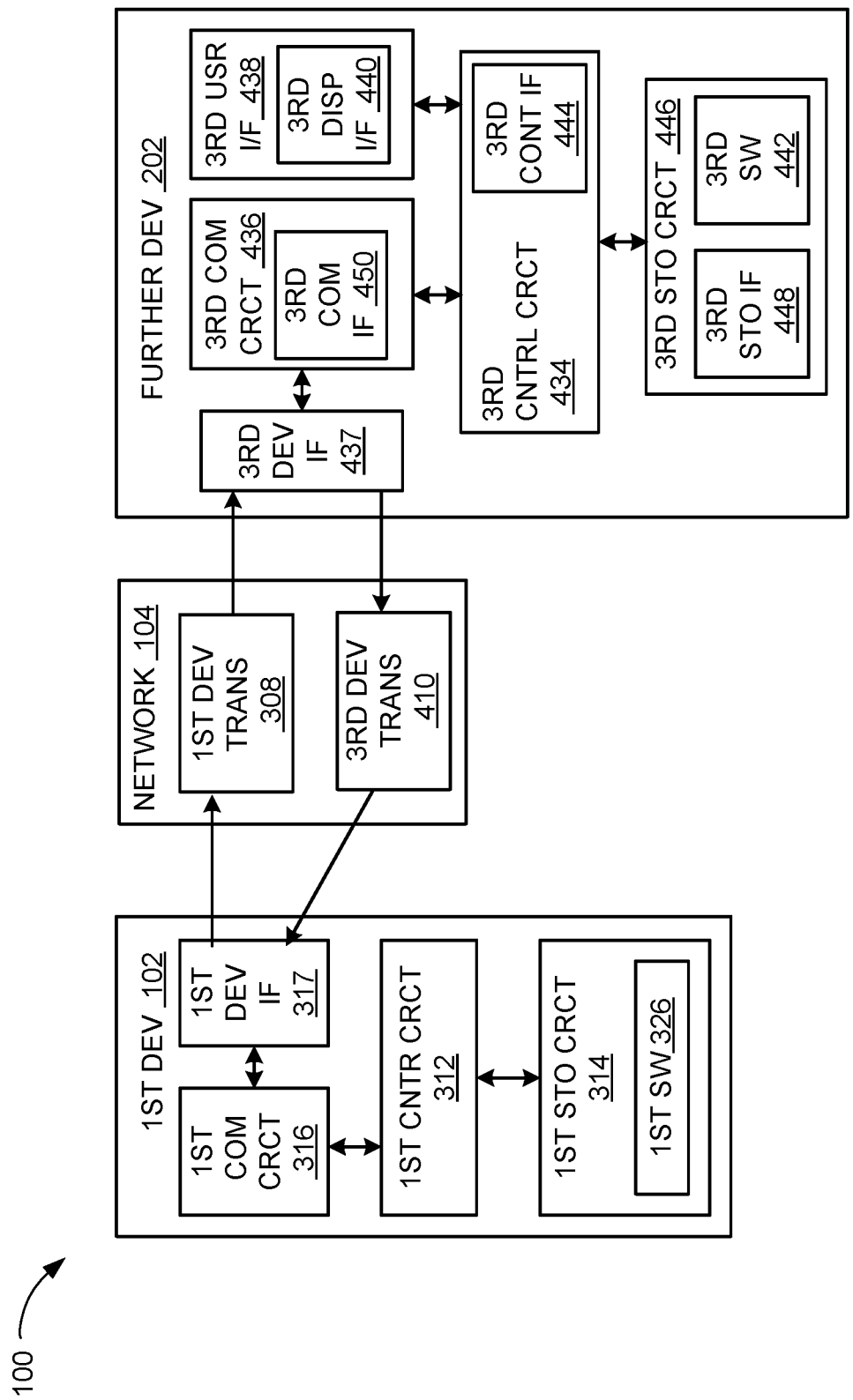
FIG. 4 is a further exemplary illustration of the computing system in the block diagram format, according to one embodiment.

Referring now to FIG. 4, therein is shown a further exemplary illustration of the computing system 100 in the block diagram format, according to one embodiment. The first device 102 can send information in the first device transmission 308 over the network 104 to the further device 202. The further device 202 can send information in a third device transmission 410 over the network 104 to the first device 102.

For illustrative purposes, the computing system 100 is shown with the further device 202 as a server, although it is understood that the computing system 100 can have the further device 202 as a different type of device. For example, the further device 202 is a client device.

For brevity of description in this embodiment of the present invention, the further device 202 will be described as a client device. The embodiment of the present invention is not limited to this selection for the type of devices. The selection is an example of an embodiment of the present invention.

The further device 202 can provide the additional or higher performance processing power compared to the first device 102. The further device 202 can include a third control circuit 434, a third communication circuit 436, and a third user interface 438.

The third user interface 438 allows a user (not shown) to interface and interact with the further device 202. The third user interface 438 can include an input device and an output device. Examples of the input device of the third user interface 438 can include a keypad, a touchpad, touch screen, soft-keys, a keyboard, a microphone, or any combination thereof to provide data and communication inputs. Examples of the output device of the third user interface 438 can include a third display interface 440. The third display interface 440 can include a display, a projector, a video screen, a speaker, or any combination thereof.

The third control circuit 434 can execute a third software 442 to provide the intelligence of the further device 202 of the computing system 100. The third software 442 can operate in conjunction with the first software 326, the second software 342 of FIG. 3, or a combination thereof. The third control circuit 434 can provide additional performance compared to the first control circuit 312.

The third control circuit 434 can operate the third user interface 438 to display information. The third control circuit 434 can also execute the third software 442 for the other functions of the computing system 100, including operating the third communication circuit 436 to communicate with the first device 102, the group-accommodation device 106, or a combination thereof over the network 104.

The third control circuit 434 can be implemented in a number of different manners. For example, the third control circuit 434 is a processor, an application specific integrated circuit (ASIC), an embedded processor, a microprocessor, hardware control logic, a hardware finite state machine (FSM), a digital signal processor (DSP), or a combination thereof.

The third control circuit 434 can include a third controller interface 444. The third controller interface 444 can be used for communication between the third control circuit 434 and other functional units or circuits in the further device 202. The third controller interface 444 can also be used for communication that is external to the further device 202.

The third controller interface 444 can receive information from the other functional units or circuits or from external sources, or can transmit information to the other functional units or circuits or to external destinations. The external sources and the external destinations refer to sources and destinations external to the further device 202.

The third controller interface 444 can be implemented in different ways and can include different implementations depending on which functional units or circuits or external units or circuits are being interfaced with the third controller interface 444. For example, the third controller interface 444 is implemented with a pressure sensor, an inertial sensor, a microelectromechanical system (MEMS), optical circuitry, waveguides, wireless circuitry, wireline circuitry, or a combination thereof.

A third storage circuit 446 can store the third software 442. The third storage circuit 446 can also store the such as data representing incoming images, data representing previously presented image, sound files, or a combination thereof. The third storage circuit 446 can be sized to provide the additional storage capacity to supplement the first storage circuit 314.

For illustrative purposes, the third storage circuit 446 is shown as a single element, although it is understood that the third storage circuit 446 can be a distribution of storage elements. Also for illustrative purposes, the computing system 100 is shown with the third storage circuit 446 as a single hierarchy storage system, although it is understood that the computing system 100 can have the third storage circuit 446 in a different configuration. For example, the third storage circuit 446 is formed with different storage technologies forming a memory hierarchal system including different levels of caching, main memory, rotating media, or off-line storage.

The third storage circuit 446 can be a volatile memory, a nonvolatile memory, an internal memory, an external memory, or a combination thereof. For example, the third storage circuit 446 is a nonvolatile storage such as nonvolatile random access memory (NVRAM), Flash memory, disk storage, or a volatile storage such as static random access memory (SRAM).

The third storage circuit 446 can include a third storage interface 448. The third storage interface 448 can be used for communication between other functional units or circuits in the further device 202. The third storage interface 448 can also be used for communication that is external to the further device 202.

The third storage interface 448 can receive information from the other functional units/circuits or from external sources, or can transmit information to the other functional units/circuits or to external destinations. The external sources and the external destinations refer to sources and destinations external to the further device 202.

The third storage interface 448 can include different implementations depending on which functional units/circuits or external units/circuits are being interfaced with the third storage circuit 446. The third storage interface 448 can be implemented with technologies and techniques similar to the implementation of the third controller interface 444.

The third communication circuit 436 can enable external communication to and from the further device 202. For example, the third communication circuit 436 permits the further device 202 to communicate with the first device 102, the second device 106 of FIG. 3, or a combination thereof over the network 104.

The third communication circuit 436 can also function as a communication hub allowing the further device 202 to function as part of the network 104 and not limited to be an end point or terminal unit to the network 104. The third communication circuit 436 can include active and passive components, such as microelectronics or resistors, for interaction with the network 104.

The third communication circuit 436 can include a baseband device or component, a modem, a digital signal processor, or a combination thereof for transmitting, formatting, receiving, detecting, decoding, further processing, or a combination thereof for communication signals. The third communication circuit 436 can include one or more portions for processing the voltages, the currents, the digital information, or a combination thereof, such as an analog-to-digital converter, a digital-to-analog converter, a filter, an amplifier, a processor-type circuitry, or a combination thereof. The third communication circuit 436 can further include one or more portions for storing information, such as cache or RAM memory, registers, or a combination thereof.

The third communication circuit 436 can be coupled with a third inter-device interface 437. The third inter-device interface 437 can be a device or a portion of a device for physically communicating signals with a separate device. The third inter-device interface 437 can communicate by transmitting or receiving signals to or from another device. The third inter-device interface 437 can include one or more antennas for wireless signals, a physical connection and receiver-transmitter for wired signals, or a combination thereof. The third inter-device interface 437 can include an omnidirectional antenna, a wire, an antenna chip, a ceramic antenna, or a combination thereof. The third inter-device interface 437 can further include a port, a wire, a repeater, a connector, a filter, a sensor, or a combination thereof.

The third inter-device interface 437 can detect or respond to a power in electromagnetic waves and provide the detected result to the third communication circuit 436 to receive a signal, including the third device transmission 408. The third inter-device interface 437 can provide a path or respond to currents or voltages provided by the third communication circuit 436 to transmit a signal, including the third device transmission 410.

The third communication circuit 436 can include a third communication interface 450. The third communication interface 450 can be used for communication between the third communication circuit 436 and other functional units or circuits in the further device 202. The third communication interface 450 can receive information from the other functional units/circuits or can transmit information to the other functional units/circuits.

The third communication interface 450 can include different implementations depending on which functional units or circuits are being interfaced with the third communication circuit 436. The third communication interface 450 can be implemented with technologies and techniques similar to the implementation of the third controller interface 444.

The first communication circuit 316 can couple with the network 104 to send information to the further device 202 in the first device transmission 308. The further device 202 can receive information in the third communication circuit 436 from the first device transmission 308 of the network 104.

The third communication circuit 436 can couple with the network 104 to send information to the first device 102 in the third device transmission 410. The first device 102 can receive information in the first communication circuit 316 from the third device transmission 410 of the network 104. The computing system 100 can be executed by the first control circuit 312, the third control circuit 434, or a combination thereof. The group-accommodation device 106 can similarly communicate and interact with the further device 202 using the corresponding units or circuits and functions therein.

For illustrative purposes, the further device 202 is shown with the partition having the third user interface 438, the third storage circuit 446, the third control circuit 434, and the third communication circuit 436, although it is understood that the further device 202 can have a different partition. For example, the third software 442 is partitioned differently such that some or all of its function can be in the third control circuit 434 and the third communication circuit 436. Also, the further device 202 can include other functional units or circuits not shown in FIG. 4 for clarity.

The functional units or circuits in the further device 202 can work individually and independently of the other functional units or circuits. The further device 202 can work individually and independently from the first device 102, the group-accommodation device 106, the host device 110, and the network 104.

For illustrative purposes, the computing system 100 is described by operation of the first device 102 and the further device 202. It is understood that the first device 102, the group-accommodation device 106, the host device 110, and the further device 202 can operate any of the blocks and functions of the computing system 100.

Figure 5:
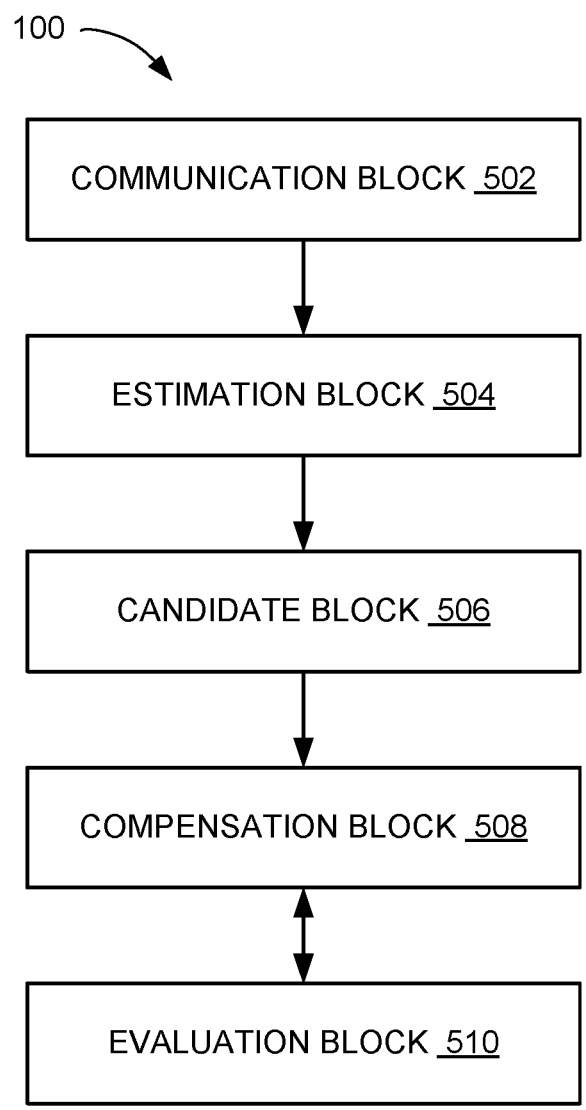
FIG. 5 is an exemplary illustration of a control flow for the computing system, according to one embodiment.

Referring now to FIG. 5, therein is shown an exemplary illustration of a control flow for the computing system 100, according to one embodiment. The computing system 100 includes a communication block 502, an estimation block 504, a candidate block 506, a compensation block 508, an evaluation block 510, or a combination thereof.

The communication block 502 can be coupled to the estimation block 504, the estimation block 504 can be coupled to the candidate block 506, the candidate block 506 can be coupled to the compensation block 508, the compensation block 508 can be coupled to the evaluation block 510, or a combination thereof. The evaluation block 510 can be further coupled to the communication block 502, the estimation block 504, the candidate block 506, or a combination thereof.

The blocks, buffers, units, or a combination thereof can be coupled to each other in a variety of ways. For example, blocks are coupled by having the input of one block connected to the output of another, such as by using wired or wireless connections, instructional steps, process sequence, or a combination thereof. Also for example, the blocks, buffers, units, or a combination thereof are coupled either directly with no intervening structure other than connection means between the directly coupled blocks, buffers, units, or a combination thereof, or indirectly with blocks, buffers, units, or a combination thereof other than the connection means between the indirectly coupled blocks, buffers, units, or a combination thereof.

As a more specific example, one or more inputs or outputs of the communication block 502 are directly connected to one or more inputs or outputs of the estimation block 504, the evaluation block 510, or a combination thereof using conductors or operational connections there-between for direct coupling, or connected through other units, blocks, buffers, devices, or a combination thereof for indirect coupling. Also for example, the estimation block 504, the candidate block 506, the compensation block 508, the evaluation block 510, or a combination thereof are coupled in a similar way.

The communication block 502 is configured to exchange or communicate the communication signal 108 of FIG. 1 between devices. The communication block 502 can exchange or communicate the communication signal 108 between the first device 102 of FIG. 1, the second device 106 of FIG. 1, the further device 202 of FIG. 2, or a combination thereof.

The communication block 502 can exchange or communicate the communication signal 108 by sending or transmitting the transmitted signal 110 of FIG. 1, receiving the received signal 112 of FIG. 1, or a combination thereof. For example, the communication block 502 includes cellular or mobile communication between a base station or an access node and a user equipment or a mobile device.

As a more specific example, the communication block 502 includes the transmitted signal 110 sent or transmitted from, the received signal 112 received by, or a combination thereof between the first device 102 and the second device 106. Also as a more specific example, the communication block 502 includes the first device 102 receiving the received signal 112 corresponding to the transmitted signal 110 transmitted by the second device 106.

Also for example, the communication block 502 includes direct communication for the direct link 204 of FIG. 2 between user equipment devices or mobile devices without any other device between the endpoint devices. As a more specific example, the communication block 502 includes the transmitted signal 110 sent or transmitted from, the received signal 112 received by, or a combination thereof directly between the first device 102 and the further device 202 without going through another device, such as the second device 106. Also as a more specific example, the communication block 502 includes the first device 102 receiving the received signal 112 corresponding to the transmitted signal 110 transmitted by the further device 202.

The communication block 502 can communicate the communication signal 108 including the repetitive portion 206 of FIG. 2, such as the synchronization portion 208 of FIG. 2 including the primary synchronization 210 of FIG. 2, the secondary synchronization 212 of FIG. 2, or a combination thereof for synchronizing communicating devices. The communication block 502 can further communicate the communication signal 108 including the reference portion 214 of FIG. 2.

The communication block 502 can further communicate the communication signal 108 corresponding to the interval set 226 of FIG. 2 including the first interval 228 of FIG. 2, the second interval 230 of FIG. 2, the third interval 232 of FIG. 2, or a combination thereof. As a more specific example, the communication block 502 includes the first device 102 receiving the received signal 112 including one or more units of communication over the interval set 226, such as over the first interval 228, the second interval 230, the third interval 232, or a combination thereof.

The communication block 502 can communicate the communication signal 108 according to a protocol or a standard. For example, the communication block 502 communicates the communication signal 108 including the repetitive portion 206 according to a communication protocol or standard. Also for example, the communication block 502 further communicates the communication signal 108 corresponding to the interval set 226.

The communication block 502 can communicate the communication signal 108 including or affected by the level offset 124 of FIG. 1 including the carrier frequency offset 126 of FIG. 1. The communication block 502 can include one more devices transmitting the transmitted signal 110 according to the transmitter setting 120 of FIG. 1, receiving the received signal 112 according to the receiver setting 122 of FIG. 1, or a combination thereof.

However, the practical or actual implementation of the transmitter setting 120 and the receiver setting 122 can include an offset from designed or intended values, such as for the carrier frequency 116 of FIG. 1. For example, the crystals designed to be tuned to the carrier frequency 116 for transmitting or receiving the information between devices includes inaccuracies or errors in implementing specific functions at the carrier frequency 116 for the first device 102, the second device 106, the further device 202, or a combination thereof.

The communication block 502 can communicate the communication signal 108 using the first inter-device interface 317 of FIG. 3, the second inter-device interface 337 of FIG. 3, the third inter-device interface 437 of FIG. 4, or a combination thereof. The communication block 502 can further control the communication signal 108 or a processing thereof associated with communication using the first communication circuit 316 of FIG. 3, the second communication circuit 336 of FIG. 3, the third communication circuit 436 of FIG. 4, the first control circuit 312 of FIG. 3, the second control circuit 334 of FIG. 3, the third control circuit 434 of FIG. 4, or a combination thereof.

The communication block 502 can store the communication signal 108 in the first storage circuit 314 of FIG. 3, the second storage circuit 346 of FIG. 3, the third storage circuit 446 of FIG. 4, the first communication circuit 316, the second communication circuit 336, the third communication circuit 436, or a combination thereof. The communication block 502 can further access or internally exchange the communication signal 108 or a processing result thereof using one or more of the interfaces represented in FIG. 3 or FIG. 4 and discussed above.

After communicating the communication signal 108 between devices, the control flow can pass from the communication block 502 to the estimation block 504. The control flow can pass through a variety of ways. For example, control flow passes by having processing results of one block passed to another block, such as by passing the communication signal 108 to the estimation block 504. Also for example, the control flow passes by storing the processing results at a location known and accessible to the estimation block 504, such as by storing the communication signal 108 at a storage location known and accessible to the estimation block 504. Also for example, the control flow passes by notifying the estimation block 504, such as by using a flag, an interrupt, a status signal, or a combination thereof.

The estimation block 504 is configured to initially estimate the level offset 124, such as the carrier frequency offset 126, for the communication signal 108. The estimation block 504 can initially estimate by calculating the initial offset estimate 128 of FIG. 1.

The estimation block 504 can calculate the initial offset estimate 128 based on, in response to, following reception of, or a combination thereof for the communication signal 108 or a portion therein. For example, the estimation block 504 calculates the initial offset estimate 128 based on, in response to, following reception of, or a combination thereof for the repetitive portion 206 of the communication signal 108, such as the synchronization portion 208 including the primary synchronization 210, the secondary synchronization 212, or a combination thereof, such as the reference portion 214, or a combination thereof.

As a more specific example, the computing system 100 or the receiver of a device therein does not yet know a relative location, a timing, a content, or a combination thereof for the signal portion that corresponds to the repetitive portion 206 at the time of operation of the estimation block 504. The estimation block 504 can calculate the estimate for each possible signal timing hypothesis assuming the repetitive structure. When the hypothesis coincides with actual timing, estimate of the level offset 124 can be a genuine estimate of the actual instance of the level offset 124. For other timing hypotheses, the initial offset estimate 128 can essentially be noise.

the estimation block 504 does not yet know a relative location, a timing, a content, or a combination thereof for the signal portion that corresponds to the repetitive portion 206 at the time of.

The estimation block 504 can calculate the initial offset estimate 128 based on or according to the interval set 226. For example, the estimation block 504 calculates the initial offset estimate 128 including the initial estimate set 234 of FIG. 2 corresponding to the interval set 226.

As a more specific example, the estimation block 504 calculates the initial offset estimate 128 including the first estimate 236 of FIG. 2 based on the communication signal 108 for the first interval 228, including the second estimate 238 of FIG. 2 based on the communication signal 108 for the second interval 230, including the third estimate 240 of FIG. 2 based on the communication signal 108 for the third interval 232, or a combination thereof. Also as a more specific example, the estimation block 504 calculates each estimate of the initial estimate set 234 corresponding to a unit of the communication signal 108, a portion within a single unit of the communication signal 108, the repetitive portion 206 of the communication signal 108, or a combination thereof.

The estimation block 504 can calculate the initial offset estimate 128 based on:

$$\hat{f}_{initial}(k) = \frac{1}{2\pi} \text{angle}(D(k)) \cdot \left(\frac{N_{FFT}}{N_{CP}+N_{FFT}}\right) \cdot f_{spacing}. \quad \text{Equation (1)}.$$

The initial offset estimate 128 can be represented by '$\hat{f}_{initial}(k)$' for 'k' corresponding to a hypothesis candidate index. The hypothesis candidate index can correspond to the dynamic candidate set 130 of FIG. 1, and further correspond to the interval set 226, the initial estimate set 234, the dynamic candidate subgrouping 242 of FIG. 2, or a combination thereof.

The range for the hypothesis candidate index can be predetermined for the computing system 100. For example, the hypothesis candidate index corresponds to a set of induces for a grouping of 20 or less candidates, such as for 0-19 or 1-20, 1-15 or 0-14, 0-8 or 1-9, or 0-2.

The term '$N_{FFT}$' can represent a symbol length for the Fast Fourier Transform (FFT) portion at a specific sampling rate, represented as '$f_s$'. utilized by the computing system 100 during communication. For example, the specific sampling rate includes any frequency or rate, as such as above 1 kHz, including 1.92 MHz, 20 MHz, or other values of sampling frequency. As a more specific example, the symbol length at the sampling rate of 1.92 MHz includes a value of 128.

For illustrative purposes, the computing system 100 is described with three intervals, with each subgrouping of the dynamic candidate set 130 including three hypotheses, as illustrated in FIG. 2. However, it is understood that the hypothesis candidate index can be more or less than a set of 9, the specific sampling rate can be more or less than 128, or a combination thereof.

The term '$N_{CP}$' can represent a cyclic prefix (CP) length at the specific sampling rate. For example, the CP length is 9 for a normal setting or 32 for an extended setting. The spacing range 118 of FIG. 1 can also be represented as '$f_{spacing}$'.

The term 'D(k)' can represent a processing mechanism for the communication signal 108. The term 'D(k)' can further represent an autocorrelation calculation for the received signal 112. The computing system 100 can perform the autocorrelation calculation based on:

$$D(k) = \Sigma_{i=0}^{N_{rx}-1} \Sigma_{k=0}^{N_{FFT}-1} r_i^*(k+N_{CP}) r_i(k+2N_{CP}+N_{FFT}). \quad \text{Equation (2)}.$$

The term '$N_{rx}$' can correspond to a capacity associated with communication, such as for one or more of the inter-device interface for the communicating device, and 'i' can be a processing index for '$N_{rx}$'. For example, the capacity represents a number of transmitting antennas, a number of receiving antennas, or a combination thereof.

The term '$r_i$' can correspond to the communication signal 108, such as the transmitted signal 110 or the received signal 112. The communication signal 108 can further be represented as '$r_i(t)$', with 'i' identifying the specific communication antenna for time index 't'.

The estimation block 504 can calculate the initial offset estimate 128, such as including the initial estimate set 234 with the first estimate 236, the second estimate 238, the third estimate 240, or a combination thereof corresponding to the interval set 226, using the first communication circuit 316, the second communication circuit 336, the third communication circuit 436, the first control circuit 312, the second control circuit 334, the third control circuit 434, or a combination thereof. The estimation block 504 can store the initial offset estimate 128 in the first storage circuit 314, the second storage circuit 346, the third storage circuit 446, the first communication circuit 316, the second communication circuit 336, the third communication circuit 436, or a combination thereof.

After calculating the initial offset estimate 128, the control flow can pass from the estimation block 504 to the candidate block 506. The control flow can pass similarly as described above between the communication block 502 and the estimation block 504, but using one or more processing results of the estimation block 504, such as the initial offset estimate 128, the communication signal 108, or a combination thereof.

The candidate block 506 is configured to generate one or more hypotheses regarding the level offset 124. The candidate block 506 can dynamically generate the one or more hypotheses based on, specific to, or after communicating the communication signal 108, such as for transmitting the transmitted signal 110, receiving the received signal 112, or a combination thereof. The candidate block 506 can dynamically generate the dynamic candidate set 130 for hypothesizing the level offset 124 including the carrier frequency offset 126. The candidate block 506 can dynamically generate the dynamic candidate set 130 instead of utilizing a set of hypotheses predetermined before the actual communication.

The candidate block 506 can dynamically generate the dynamic candidate set 130 based on the initial offset estimate 128. The candidate block 506 can generate the dynamic candidate set 130 based on the initial offset estimate 128 including the initial estimate set 234 over the interval set 226.

The candidate block 506 can generate the dynamic candidate set 130 including the dynamic candidate subgrouping 242, such as the first subgrouping 244 of FIG. 2, the second subgrouping 246 of FIG. 2, the third subgrouping 248 of FIG. 2, or a combination thereof. The candidate block 506 can generate the dynamic candidate set 130 based on the initial estimate set 234. For example, the candidate block 506 generates the first subgrouping 244 based on the first estimate 236 for the first interval 228, the second subgrouping 246 based on the second estimate 238 for the second interval 230, the third subgrouping 248 based on the third estimate 240 for the third interval 232, or a combination thereof.

The candidate block 506 can generate the dynamic candidate set 130 based on:

$$\hat{f}(k) = n \cdot f_{range} + \hat{f}_{initial}(k).$$ Equation (3).

The dynamic candidate set 130 can be represented as '$\hat{f}(k)$'. The dynamic candidate set 130 can be generate based on the initial offset estimate 128 represented as '$\hat{f}_{initial}(k)$' and described in Equation (1).

The term '$f_{range}$' can represent the level range 220 of FIG. 2 including the first boundary 222 of FIG. 2 and the second boundary 224 of FIG. 2. The level range 220 can be represented as:

$$f_{range} = \left(\frac{N_{FFT}}{N_{CP} + N_{FFT}}\right) \cdot f_{spacing}.$$ Equation (4).

As an illustrative example, the communication block 502, the estimation block 504, the candidate block 506, or a combination thereof includes a synchronization detector mechanism including an initial compensation of a searcher input by a hypothesized CFO. After the CFO compensation, the synchronization detector mechanism can perform time domain correlation with the transmitted or received instance of the synchronization portion 208 of the communication signal 108. The computing system 100 can estimate the CFO for each time sample index 't' based on Equation (1)-Equation (4) discussed above.

The computing system 100 can further include a range of 'n' processing induces. The index of 'n' can correspond to time for the communication signal 108. The values of 'n' can be based on samples corresponding to the specific sampling frequency. The range of n', the sampling frequency, time interval associated thereto, or a combination thereof can be predetermined by the computing system 100 according to the communication protocol, format, or standard.

For example, the values of 'n' ranges up to any number, such as for 100-10000 samples, or any other number of samples corresponding to the time interval, such as between 1-100 mSec. As a more specific example, the values of 'n' are be based on a 5 mSec time interval for 1.92 MHz sampling rate, and include 9600 candidates.

It has been discovered that dynamic processing of the dynamic candidate set 130 based on the initial offset estimate 128 according to the communication signal 108 provides reduced complexity. The dynamic generation of the dynamic candidate set 130 can eliminate predetermined or stored static candidates.

It has further been discovered that the dynamic candidate set 130 including the first subgrouping 244, the second subgrouping 246, and the third subgrouping 248 corresponding to the interval set 226 including the first interval 228, the second interval 230, and the third interval 232 provides reduction in resource requirements. The dynamic candidate set 130 can include less than 20 hypotheses, and more specifically, can operate with 9 or less hypotheses. The reduction in the number of hypotheses can reduce the processing complexity, such as in hardware size, capacity, or a combination thereof for processing the CFO.

It has further been discovered that the dynamic candidate set 130 based on the repetitive portion 206 of the communication signal 108 provides increased efficiency. The dynamic candidate set 130 can utilize the repetitive portion 206 already within or integral with the communication signal 108 with the multiple bins for estimates and the candidate hypotheses corresponding to the interval sets without requiring additional repetition of signals.

The candidate block 506 can generate the one or more hypotheses regarding the level offset 124 using the first communication circuit 316, the second communication circuit 336, the third communication circuit 436, the first control circuit 312, the second control circuit 334, the third control circuit 434, or a combination thereof. The candidate block 506 can store the dynamic candidate set 130 or any other processing result discussed above in the first storage circuit 314, the second storage circuit 346, the third storage circuit 446, the first communication circuit 316, the second communication circuit 336, the third communication circuit 436, or a combination thereof.

After generating the one or more hypotheses, the control flow can pass from the candidate block 506 to the compensation block 508. The control flow can pass similarly as described above between the communication block 502 and the estimation block 504, but using one or more processing results of the candidate block 506, such as the dynamic candidate set 130, the initial offset estimate 128, the communication signal 108, or a combination thereof.

The compensation block 508 is configured to compensate or adjust the communicating devices. The compensation block 508 can compensate or adjust the transmitter setting 120, the receiver setting 122, or a combination thereof. The compensation block 508 can compensate or adjust the setting for the carrier frequency 116 for correcting for the level offset 124 including the carrier frequency offset 126. The compensation block 508 can compensate or adjust the setting for the carrier frequency 116 based on or according to the one or more hypotheses of the dynamic candidate set 130.

The compensation block 508 can compensate or adjust the transmitter setting 120, the receiver setting 122, or a combination thereof over the interval set 226. For example, the compensation block 508 compensates or adjusts the transmitter setting 120, the receiver setting 122, or a combination thereof based on or according to the first subgrouping 244 for the first interval 228, the second subgrouping 246 for the second interval 230, the third subgrouping 248 for the third interval 232, or a combination thereof. As a more specific example, the compensation block 508 compensates or adjusts over multiple repetitive or synchronization periods.

The compensation block 508 can compensate or adjust using the first communication circuit 316, the second communication circuit 336, the third communication circuit 436, the first control circuit 312, the second control circuit 334, the third control circuit 434, a portion therein, or a combination thereof. For example, the compensation block 508 controls or adjusts a tuning circuit, a crystal, an adjustment circuit, a selection circuit, or a combination thereof.

After compensating or adjusting, the control flow can pass from the compensation block 508 to the evaluation block 510. The control flow can pass similarly as described above between the communication block 502 and the estimation block 504, but using one or more processing results of the compensation block 508, such as a result of implementing one or more of the hypothesis, the dynamic candidate set 130, the initial offset estimate 128, the communication signal 108, or a combination thereof.

The evaluation block 510 is configured to evaluate one or more of the hypothesis. The evaluation block 510 can evaluate the adjustment or the compensation corresponding to the one or more hypothesis of the dynamic candidate set 130 or a portion therein.

The evaluation block 510 can evaluate by calculating the hypothesis evaluation metric 132 of FIG. 1. The evaluation block 510 can calculate the hypothesis evaluation metric 132 based on the communication signal 108 for evaluating the dynamic candidate set 130 or one or more of the hypothesis therein.

The evaluation block 510 can calculate the hypothesis evaluation metric 132 for each hypothesis in the dynamic candidate set 130, a subgrouping thereof, or a combination thereof. The evaluation block 510 can calculate the hypothesis evaluation metric 132 based on:

$$y_{p,k}(n) = \sum_{i=0}^{N_{rx}-1}\left(\left|\sum_{n=0}^{N-1}[r_i(n+2t) + e^{-j\phi_k(n)} \cdot r_i(n+2t+T_{SyncSymGap})] \cdot w_p^*(t) e^{-j2\pi\frac{f_k(n)}{f_s}2t}\right|^2\right).$$ Equation (5).

$$\phi_k(n) = 2\pi\frac{f_k(n)}{f_s} \cdot (N_{sym} + N_{CP}).$$ Equation (6).

The hypothesis evaluation metric 132 can be represented as '$y_{p,k}(n)$' for a candidate indexed by 'n'. The term 'pi' can represent an identification of the repetitive portion 206, such as identification for the synchronization portion 208, the reference portion 214, or a combination thereof. The term '$f_k(n)$' can represent a CFO hypothesis candidate of the dynamic candidate set 130. The term '$f_k(n)$' can represent a CFO hypothesis candidate for bin or interval 'k' at the index 'n'.

The term '$\phi_k(n)$' can represent an accumulated phase difference between a start of multiple repetitions due to the frequency hypothesis '$f_k(n)$'. The term '$N_{sym}$' can represent a symbol length for the Fast Fourier Transform (FFT) at the specific sampling rate. The term 'N' can include a value half of the symbol length. For example, the symbol length at '$f_s$' of 1.92 MHz includes a value of 128 and the term 'N' can include a value of 64.

The term '$T_{SyncSymGap}$' can represent a repetitive portion gap or a separation between instances of the repetitive portion 206. For example, the term '$T_{SyncSymGap}$' represents a gap between two copies of symbols for the primary synchronization 210, the secondary synchronization 212, the reference portion 214, or a combination thereof.

The term '$w_p(t)$' can represent a time domain repetitive signal. The term '$w_p(t)$' can represent a time domain signal for the repetitive portion 206 corresponding to the identification p' and index 't'.

The computing system 100 can further utilize a normalization factor along with Equation (5), Equation (6), or a combination thereof. The normalization factor can be calculated based on the communication signal 108, such as the transmitted signal 110 or the received signal 112, as represented by '$r_1$' above, index 't', index 'n', the repetitive portion gap, other elements represented in Equations (1)-(6), or a combination thereof.

The computing system 100 can include terms or settings predetermined for processing the communication signal 108. For example, the computing system 100 includes terms such as the symbol length represented above as '$N_{sym}$', the related term represented above as 'N', the sampling frequency represented above as '$f_s$', the synchronization symbol gap represented above as '$T_{SyncSymGap}$' or a combination thereof.

The computing system 100 can include the predetermined terms or have them included or implemented in hardware circuits for one or more of the communication circuits, one or more of the control circuits, one or more of the storage circuits, or a combination thereof. The computing system 100 can access the predetermined terms using one or more of the interfaces, one or more of the communication circuits, or a combination thereof.

The evaluation block 510 can determine the level offset 124 including the carrier frequency offset 126 and adjust the devices accordingly based on the hypothesis evaluation metric 132 and the dynamic candidate set 130. The evaluation block 510 can determine the level offset 124 for the communication signal 108 for communicating between the devices, such as for the first device 102, the second device 106, the further device 202, or a combination thereof.

The evaluation block 510 can determine the level offset 124 for the communication signal 108 corresponding to the direct link 204. The evaluation block 510 can also determine the level offset 124 for communications between a user equipment or mobile device and an access point or base station.

The evaluation block 510 can determine the level offset 124 such as the carrier frequency offset 126 based on analyzing the hypothesis evaluation metric 132 corresponding to each of the hypotheses in the dynamic candidate set 130. The evaluation block 510 can determine the level offset 124 as the hypothesis candidate within the dynamic candidate set 130 corresponding to an optimal instance of the hypothesis evaluation metric 132, such as a lowest value, a highest value, or a value closest to a threshold or a range.

It has been discovered that the hypothesis evaluation metric 132 and the dynamic candidate set 130 provide increased efficiency and decreased complexity. The hypothesis evaluation metric 132 and the dynamic candidate set 130 can evaluate the hypotheses over multiple synchronization periods. The reduced size of the hypotheses set can further efficiently be implemented over the multiple synchronization periods to eliminate or adjust for the level offset 124.

The evaluation block 510 can evaluate the one or more of the hypotheses using the first communication circuit 316, the second communication circuit 336, the third communication circuit 436, the first control circuit 312, the second control circuit 334, the third control circuit 434, a portion therein, or a combination thereof. The evaluation block 510 can store the processing result, such as the hypothesis evaluation metric 132, selected hypothesis from the dynamic candidate set 130, the level offset 124, or a combination thereof in the first storage circuit 314, the second storage circuit 346, the third storage circuit 446, the first communication circuit 316, the second communication circuit 336, the third communication circuit 436, or a combination thereof.

After evaluating the one or more of the hypotheses, the control flow can pass from the evaluation block 510 to the compensation block 508. The control flow can pass similarly as described above between the communication block 502 and the estimation block 504, but using one or more processing results of the evaluation block 510, such as the hypothesis evaluation metric 132, selected hypothesis from the dynamic candidate set 130, the level offset 124, the dynamic candidate set 130, the initial offset estimate 128, the communication signal 108, or a combination thereof.

The compensation block 508 can adjust or compensate the communication device according to the selected hypothesis from the dynamic candidate set 130, the level offset 124, or a combination thereof. The compensation block 508 can adjust or compensate the communication device as described above, such as based on adjusting or compensating the transmitter setting 120, the receiver setting 122, the first device 102, the second device 106, the further device 202, or a combination thereof.

Figure 6:
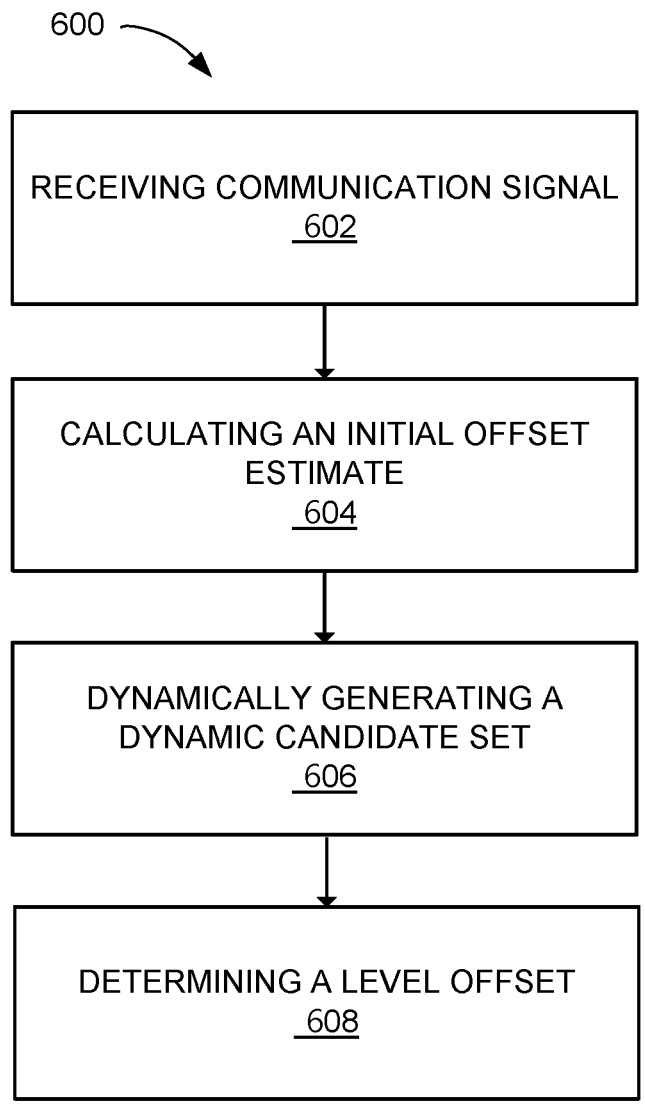
FIG. 6 is a further exemplary illustration of a flow chart for a method of operation for the computing system, according to one embodiment.

Referring now to FIG. 6, therein is shown a further exemplary illustration of a flow chart 600 for a method of operation for the computing system 100 of FIG. 1, according to one embodiment. The method 600 includes: receiving a communication signal for communicating between a device and a further device at 602; calculating an initial offset estimate based on the communication signal at 604; dynamically generating a dynamic candidate set with a communication unit based on the initial offset estimate at 606; and determining a level offset for the communication signal for communicating between the device and the further device at 608.

The blocks described in this application can be hardware implementation or hardware accelerators, including passive circuitry, active circuitry, or both, in the first communication circuit 316 of FIG. 3, the second communication circuit 336 of FIG. 3, the third communication circuit 436 of FIG. 4, the first control circuit 312 of FIG. 3, the second control circuit 334 of FIG. 3, the third control circuit 438 of FIG. 4, or a combination thereof. The blocks can also be hardware implementation or hardware accelerators, including passive circuitry, active circuitry, or both, within the first device 102 of FIG. 1, the second device 106 of FIG. 1, the further device 202 of FIG. 2, or a combination thereof but outside of the first communication circuit 316, the second communication circuit 336, the third communication circuit 436, the first control circuit 312, the second control circuit 334, the third control circuit 334, or a combination thereof.

The computing system 100 of FIG. 1 has been described with block functions or order as an example. The computing system 100 can partition the blocks differently or order the blocks differently. For example, the compensation block 508 of FIG. 5 and the evaluation block 510 of FIG. 5 can be combined into one block. Also for example, the compensation block 508 and the evaluation block 510 include multiple instances of sub-blocks corresponding to the repetitive portions.

For illustrative purposes, the various blocks have been described as being specific to the first device 102, the second device 106, the further device 202, or a combination thereof. However, it is understood that the blocks can be distributed differently. For example, the various blocks are implemented in a different device, or the functionalities of the blocks can be distributed across multiple devices. Also as an example, the various blocks are stored in a non-transitory memory medium.

As a more specific example, one or more blocks described above can be stored in the non-transitory memory medium for distribution to a different system, a different device, a different user, or a combination thereof, for manufacturing, or a combination thereof. Also as a more specific example, the blocks described above can be implemented or stored using a single hardware unit, such as a chip or a processor, or across multiple hardware units.

The blocks described in this application can be stored in the non-transitory computer readable medium. The first communication circuit 316, the second communication circuit 336, the third communication circuit 436, the first storage circuit 314, the second storage circuit 346, the third storage circuit 446, or a combination thereof can represent the non-transitory computer readable medium. The first communication circuit 316, the second communication circuit 336, the third communication circuit 436, the first storage circuit 314, the second storage circuit 346, the third storage circuit 446, or a combination thereof, or a portion therein can be removable from the first device 102, the second device 106, the further device 202, or a combination thereof. Examples of the non-transitory computer readable medium can be a non-volatile memory card or stick, an external hard disk drive, a tape cassette, or an optical disk.

The physical transformation of the initial offset estimate 128 of FIG. 1 and the dynamic candidate set 130 of FIG. 1 result in the movement in the physical world, such as in changes to the communication level 114 of FIG. 1, the transmitter setting 120 of FIG. 1, the receiver setting 122 of FIG. 1, or a combination thereof. The subsequent adjusted communication can further lead to other movements in the physical world, such as content displayed or recreated for the user on the first device 102 from processing the communication signal 108 of FIG. 1. The content reproduced on the first device 102, such as navigation information or voice signal of a caller, can influence the user's movement, such as following the navigation information or replying back to the caller. Movement in the physical world results in changes to the communication channel, the geographic location of the first device 102, or a combination thereof, which can be fed back into the computing system 100 and further influence the processing for the changes in the level offset 124 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment described herein is that it valuably supports and services the historical trend of reducing costs, simplifying systems, and increasing performance.

These and other valuable aspects of an embodiment consequently further the state of the technology to at least the next level.

While the embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
an inter-device interface configured to:
    receive a communication signal including a carrier frequency offset for communicating between a device and a further device, wherein the communication signal corresponds to an interval set including a first interval and a second interval;
a communication circuit, coupled to the inter-device interface, configured to:
    calculate an initial offset estimate for initially estimating the carrier frequency offset based on the communication signal, wherein calculating the initial offset estimate includes calculating a first estimate based on the first interval and a second estimate based on the second interval;
    dynamically generate a dynamic candidate set of possible instances of a level offset including the carrier frequency offset, wherein dynamically generating the dynamic candidate set includes a first subgrouping based on the first estimate for the first interval and a second subgrouping based on the second estimate for the second interval for hypothesizing the carrier frequency offset based on the initial offset estimate;
    calculate a hypothesis evaluation metric based on the communication signal for evaluating the dynamic candidate set; and
    determine the level offset including the carrier frequency offset based on the hypothesis evaluation metric and the dynamic candidate set for the communication signal for communicating between the device and the further device.

2. The system as claimed in claim 1 wherein:
the inter-device interface is configured to receive the communication signal including a synchronization portion for synchronizing the device and the further device; and
the communication circuit is configured to calculate the initial offset estimate based on the synchronization portion.

3. The system as claimed in claim 1 wherein:
the inter-device interface is configured to receive the communication signal including a repetitive portion; and
the communication circuit is configured to calculate the initial offset estimate based on the repetitive portion.

4. The system as claimed in claim 1 wherein:
the inter-device interface is configured to receive the communication signal including primary synchronization, a secondary synchronization, or a combination thereof;
the communication circuit is configured to calculate the initial offset estimate based on the primary synchronization, the secondary synchronization, or a combination thereof.

5. The system as claimed in claim 1 wherein:
the inter-device interface is configured to receive the communication signal including a reference portion;
the communication circuit is configured to calculate the initial offset estimate based on the reference portion.

6. The system as claimed in claim 1 wherein:
the inter-device interface is configured to receive the communication signal for a direct link for communicating directly between user devices including the device and the further device; and
the communication circuit is configured to determine the level offset for the direct link.

7. A method of operation of a computing system comprising:
receiving a communication signal including a carrier frequency offset for communicating between a device and a further device, wherein the communication signal corresponds to an interval set including a first interval and a second interval;
calculating an initial offset estimate for initially estimating the carrier frequency offset based on the communication signal, wherein calculating the initial offset estimate includes calculating a first estimate based on the first interval and a second estimate based on the second interval;
dynamically generating a dynamic candidate set of possible instances of a level offset including the carrier frequency offset, with a communication circuit, wherein dynamically generating the dynamic candidate set includes a first subgrouping based on the first estimate for the first interval and a second subgrouping based on the second estimate for the second interval for hypothesizing the carrier frequency offset based on the initial offset estimate;

calculating a hypothesis evaluation metric based on the communication signal for evaluating the dynamic candidate set; and determining the level offset including the carrier frequency offset based on the hypothesis evaluation metric and the dynamic candidate set for the communication signal for communicating between the device and the further device.

8. The method as claimed in claim 7 wherein:

receiving the communication signal includes receiving the communication signal including a synchronization portion for synchronizing the device and the further device; and calculating the initial offset estimate includes calculating the initial offset estimate based on the synchronization portion.

9. The method as claimed in claim 7 wherein:

receiving the communication signal includes receiving the communication signal including a repetitive portion; and calculating the initial offset estimate includes calculating the initial offset estimate based on the repetitive portion.

10. A non-transitory computer readable medium including instructions for a computing system comprising:

receiving a communication signal including a carrier frequency offset for communicating between a device and a further device, wherein the communication signal corresponds to an interval set including a first interval and a second interval;

calculating an initial offset estimate for initially estimating the carrier frequency offset based on the communication signal, wherein calculating the initial offset estimate includes calculating a first estimate based on the first interval and a second estimate based on the second interval;

dynamically generating a dynamic candidate set of possible instances of a level offset including the carrier frequency offset, wherein dynamically generating the dynamic candidate set includes a first subgrouping based on the first estimate for the first interval and a second subgrouping based on the second estimate for the second interval for hypothesizing the carrier frequency offset based on the initial offset estimate;

calculating a hypothesis evaluation metric based on the communication signal for evaluating the dynamic candidate set; and determining the level offset including the carrier frequency offset based on the hypothesis evaluation metric and the dynamic candidate set for the communication signal for communicating between the device and the further device.

11. The non-transitory computer readable medium as claimed in claim 10 wherein:

receiving the communication signal includes receiving the communication signal including a synchronization portion for synchronizing the device and the further device; and calculating the initial offset estimate includes calculating the initial offset estimate based on the synchronization portion.

12. The non-transitory computer readable medium as claimed in claim 10 wherein:

receiving the communication signal includes receiving the communication signal including a repetitive portion; and calculating the initial offset estimate includes calculating the initial offset estimate based on the repetitive portion.

* * * * *